United States Patent
Cowley et al.

(10) Patent No.: US 11,048,858 B2
(45) Date of Patent: Jun. 29, 2021

(54) BROWSER EXTENSION FOR THE COLLECTION AND DISTRIBUTION OF DATA AND METHODS OF USE THEREOF

(71) Applicant: ROOFOVERYOURHEAD MARKETING LTD., Victoria (CA)

(72) Inventors: Adam Alexander Cowley, Victoria (CA); Anton Sivolapov, Rostov-on-Don (RU)

(73) Assignee: ROOFOVERYOURHEAD MARKETING LTD., Victoria (CA)

(*) Notice: Subject to any disclaimer, the term of this patent is extended or adjusted under 35 U.S.C. 154(b) by 173 days.

(21) Appl. No.: 14/646,316

(22) PCT Filed: Nov. 21, 2013

(86) PCT No.: PCT/CA2013/050889
§ 371 (c)(1),
(2) Date: May 20, 2015

(87) PCT Pub. No.: WO2014/078961
PCT Pub. Date: May 30, 2014

(65) Prior Publication Data
US 2015/0309971 A1     Oct. 29, 2015

Related U.S. Application Data

(60) Provisional application No. 61/728,899, filed on Nov. 21, 2012.

(51) Int. Cl.
*G06F 40/143* (2020.01)
*G06F 9/445* (2018.01)
(Continued)

(52) U.S. Cl.
CPC ........ *G06F 40/143* (2020.01); *G06F 9/44526* (2013.01); *G06Q 30/06* (2013.01);
(Continued)

(58) Field of Classification Search
CPC ............ G06F 17/2247; G06F 9/44526; G06F 40/143; H04L 67/02; H04L 67/2895;
(Continued)

(56) References Cited

U.S. PATENT DOCUMENTS 6,651,217 B1* 11/2003 Kennedy ............... G06F 40/174
715/224
7,873,707 B1* 1/2011 Subramanian .... G06F 17/30887
709/219

(Continued)

FOREIGN PATENT DOCUMENTS

| EP | 1662366 | 5/2006 |
|---|---|---|
| WO | WO9960504 | 11/1999 |
| WO | WO2001050299 | 7/2011 |

OTHER PUBLICATIONS

International Search Report issued in PCT/CA2013/050889 dated Feb. 6, 2014.

*Primary Examiner* — Thu V Huynh
(74) *Attorney, Agent, or Firm* — Knobbe, Martens, Olson & Bear LLP

(57) ABSTRACT

A system for use in automated aggregation and distribution of content to and from at least one webpage on the Internet comprises an API server which includes a webpage served by the API server for use by a user on a user device. The user device and the API server are each associated with an at least one identifier. There is a browser and a browser extension. The browser extension is configured to instruct the browser to communicate the at least one identifier associated with the user device to the at least one website and not communicate the at least one identifier associated with the API server. The browser extension transiently stores and/or manipulates content and communicates content between the client applica- (Continued)

tion, the API server and at least one website in response to an input from the user, such that the user distributes content to the at least one website.

16 Claims, 7 Drawing Sheets

(51) Int. Cl.
G06Q 50/16 (2012.01)
G06Q 30/06 (2012.01)
H04L 29/08 (2006.01)

(52) U.S. Cl.
CPC ......... *G06Q 30/0645* (2013.01); *G06Q 50/16* (2013.01); *G06Q 50/163* (2013.01); *H04L 67/02* (2013.01); *H04L 67/2895* (2013.01)

(58) Field of Classification Search
CPC .... G06Q 30/06; G06Q 30/0645; G06Q 50/16; G06Q 50/163; G06Q 30/065; G06Q 30/0945
USPC .......................................... 715/234
See application file for complete search history.

(56) References Cited

U.S. PATENT DOCUMENTS

| | | | |
|---|---|---|---|
| 8,166,522 B2 | 4/2012 | Martin | |
| 2001/0027483 A1* | 10/2001 | Gupta | G06Q 10/087 709/219 |
| 2001/0054020 A1* | 12/2001 | Barth | G06F 17/30867 705/37 |
| 2002/0005867 A1* | 1/2002 | Gvily | G06F 17/3089 715/760 |
| 2002/0046109 A1* | 4/2002 | Leonard | G06Q 30/02 705/14.23 |
| 2002/0078136 A1 | 6/2002 | Brodsky | |
| 2002/0186249 A1* | 12/2002 | Lu | G06F 21/31 715/781 |
| 2003/0229900 A1* | 12/2003 | Reisman | G06F 17/30873 725/87 |
| 2004/0109011 A1* | 6/2004 | Peterson, Jr. | G06F 17/30905 715/700 |
| 2005/0278475 A1 | 12/2005 | Karatal | |
| 2005/0283473 A1* | 12/2005 | Rousso | G06F 16/3322 |
| 2006/0112123 A1* | 5/2006 | Clark | G06F 40/18 |
| 2006/0179404 A1* | 8/2006 | Yolleck | G06F 40/174 715/272 |
| 2006/0206584 A1* | 9/2006 | Hyder | G06Q 30/08 709/218 |
| 2006/0224951 A1* | 10/2006 | Burke | G06F 17/30899 715/234 |
| 2006/0294258 A1 | 12/2006 | Powers-Boyle | |
| 2007/0022419 A1* | 1/2007 | Subbarao | G06F 17/3089 717/173 |
| 2007/0094076 A1* | 4/2007 | Perkowski | G06Q 30/0241 705/14.51 |
| 2007/0198344 A1* | 8/2007 | Collison | G06F 17/30864 705/14.1 |
| 2007/0294265 A1* | 12/2007 | Askew | G06F 17/30884 |
| 2008/0118227 A1* | 5/2008 | Barton | H04N 5/76 386/332 |
| 2008/0154878 A1* | 6/2008 | Rose | G06F 17/30867 |
| 2008/0162275 A1* | 7/2008 | Logan | G06F 17/30654 705/12 |
| 2008/0184102 A1* | 7/2008 | Selig | G06F 17/243 715/234 |
| 2008/0228867 A1* | 9/2008 | Murphy | G06F 17/30194 709/203 |
| 2008/0275888 A1* | 11/2008 | Shuster | G06F 17/30867 |
| 2008/0313260 A1 | 12/2008 | Sweet | |
| 2008/0313529 A1* | 12/2008 | Gwozdz | G06F 40/174 715/224 |
| 2008/0313648 A1 | 12/2008 | Wang | |
| 2008/0320075 A1* | 12/2008 | Livshits | H04L 63/145 709/203 |
| 2009/0019353 A1* | 1/2009 | Abrams | G06F 17/2247 715/224 |
| 2009/0287706 A1* | 11/2009 | Bourges-Waldegg | G06F 21/6209 |
| 2009/0300103 A1* | 12/2009 | Matsutsuka | H04L 67/2819 709/203 |
| 2010/0037177 A1* | 2/2010 | Golsorkhi | G06Q 30/0603 715/818 |
| 2010/0094860 A1* | 4/2010 | Lin | G06Q 30/02 707/709 |
| 2010/0114719 A1 | 5/2010 | Steelberg | |
| 2010/0115430 A1* | 5/2010 | Skirpa | G06F 17/2247 715/760 |
| 2010/0146379 A1* | 6/2010 | George | G06F 21/53 715/234 |
| 2010/0217664 A1 | 8/2010 | Steelberg | |
| 2010/0250397 A1* | 9/2010 | Ippolito | G06Q 30/02 705/26.1 |
| 2011/0161398 A1* | 6/2011 | Guccione | G06Q 10/10 709/203 |
| 2011/0302653 A1* | 12/2011 | Frantz | G06F 21/552 726/22 |
| 2012/0010995 A1* | 1/2012 | Skirpa | G06F 3/0481 705/14.49 |
| 2012/0124372 A1* | 5/2012 | Dilley | H04L 67/2819 713/162 |
| 2012/0137206 A1* | 5/2012 | Saito | G06F 17/243 715/224 |
| 2012/0311424 A1 | 12/2012 | Bobykin | |
| 2012/0317295 A1* | 12/2012 | Baird | H04L 67/02 709/228 |
| 2012/0323794 A1 | 12/2012 | Livshits | |
| 2013/0018912 A1* | 1/2013 | Bao | G06F 16/951 707/769 |
| 2013/0215747 A1* | 8/2013 | Jia | H04L 45/22 370/235 |
| 2013/0311872 A1* | 11/2013 | Jokl, III | G06F 17/3089 715/234 |
| 2014/0067934 A1* | 3/2014 | Ware | G06Q 50/01 709/204 |
| 2014/0359415 A1* | 12/2014 | Song | G06F 17/2229 715/206 |

* cited by examiner

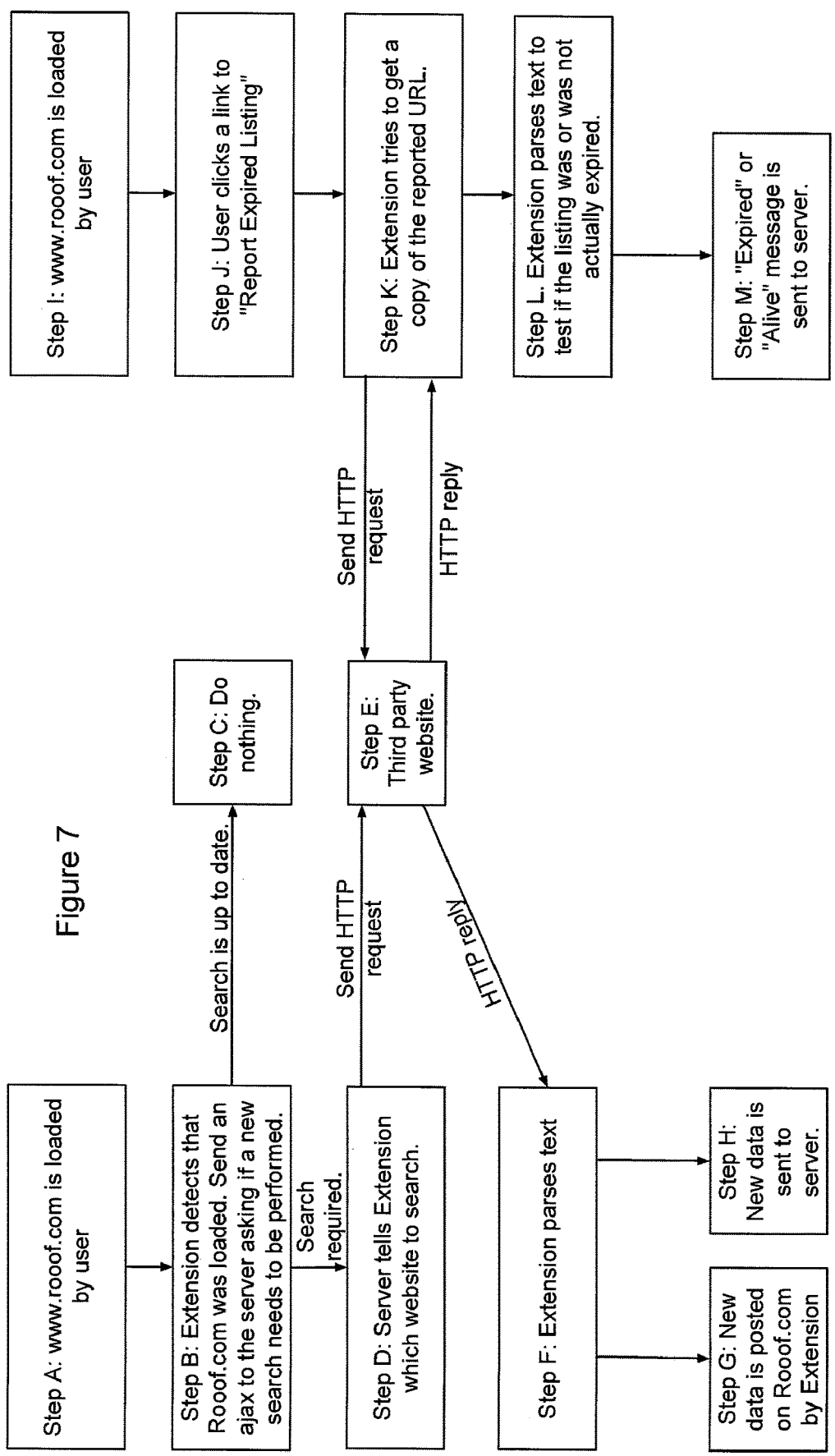

BROWSER EXTENSION FOR THE COLLECTION AND DISTRIBUTION OF DATA AND METHODS OF USE THEREOF

BACKGROUND OF THE INVENTION

Field of the Invention

The present technology relates to a system and method of conducting business using a browser extension to distribute or search for goods, services, and real property advertised, or made for offer. More specifically, the method allows for automated distribution, search, notification, storage and manipulation that is transparent to the target publisher websites wherein the publisher intends to block automated distribution or aggregation.

Description of the Related Art

Activity on the Internet can be traced and identified using the Internet Protocol (IP) address and User Agent and behavior for a device. An IP address is a number that identifies where a device or network connects to the Internet or in the network. Websites keep a record of IP addresses and User Agents of users as a means of identifying undesired users or behaviors. Hence, if an origin computer is distributing information to a publisher's website it will be easy to notice that interactions were automated based on identifiers and behaviors.

There are a number of ways to hide or obscure an IP address. One way is to use proxy servers which have their own IP address and can be used rather than 'a user's own IP address. Instead of the user's IP address being displayed, the proxy server IP address will appear. Another way is to use human labor to manually distribute content so that identifiers appear non-automated. Another way is to purchase access to the destination website. None of these approaches allow distribution to be performed unnoticed and/or unimpeded.

More recently, methods have been developed that include steps that cannot be seen by either a user or by a website. For example, U.S. Pat. No. 8,108,459 discloses a "Virtual Collectible Distribution Network" that generates and distributes Virtual Collectible objects, each potentially possessing unique properties, over a computer network such as the Internet, to a group of users. The Distribution Network utilizes a client-server system. The client software can be standalone or embedded in another application, such as a web browser or game. In one scenario, the client software observes certain behaviors of the user, and communicates such behavior to the server, which process is transparent to the user.

Distribution of website information is one of the strengths of the Internet. U.S. Pat. No. 8,166,522 discloses an automated method for obtaining selected content for a web page that allows for distribution of digital assets. The selected content itself is not initially part of the web page. The web page includes script associated with the selected content. Upon receiving a web page that includes script associated with the selected content, the script is interpreted. A request is then formatted for obtaining the selected content from a remote site. The request includes a uniform resource identifier (URI) of the web page and a unique identifier of the selected content. The script includes a subscriber identifier and a content identifier, which, together, create the unique identifier of the selected content.

In a related technology, US Publication No. 2002/0078136 discloses a method for crawling a web site. At least one page of the web site has a reference for executing by a browser to produce an address for a next page. The web site is crawled by a crawler program, which includes querying a web site server. The crawler parses such a reference from one of the web pages, and sends the reference to an applet running in a browser. The address for the next page is determined by the browser responsive to the reference. The address is then sent to the crawler. In an application of the crawler, the crawler is used for reducing dynamic data generation on the web site server. In this application, at least some of the web pages are dynamically generated responsive to the crawler queries. The server generated web pages are processed to generate corresponding processed versions of the web pages, so that the processed versions can be served in response to future queries, reducing dynamic generation of web pages by the server.

An example of browser extensions is disclosed in US Publication No. 2008/0184102, where methods associated with a web browser extension are described. One example of a browser extension includes a web form capture logic that identifies a web page that includes a form and an editable field on the form. The capture logic may acquire information about the field and about the form. This acquisition may include interacting with a user through a graphical user interface. The browser extension may also include a template logic to create a form-fill template based on the acquired information and a web form storage logic to store the template. The template may be referenced when a subsequent web page view involves a form-fill operation.

A system is needed that allows a user to easily distribute content either manually or automatically on the Internet in a manner that obscures the fact that distribution is occurring.

SUMMARY OF THE INVENTION

A system for use in the collection and distribution of content to and from an at least one webpage on the Internet is provided that allows for a user to distribute content in a manner that obscures the fact that distribution or collection is occurring or that it is occurring through automated means.

In one embodiment, a system for use in the collection and distribution of a content to and from a plurality of webpages is provided, the system comprising:
an application programming interface (API) server, the API server associated with an at least one API server identifier;
a user device, the user device having an at least one identifier;
a browser; and
a browser extension, the browser extension associated with an at least one browser extension identifier, wherein the user device, the browser, the browser extension, and an Internet Protocol (IP) address collectively represent the at least one identifier associated with the user device to an at least one publisher webpage and do not communicate the at least one API server identifier.

In the system, the user device, the browser, the browser extension and the IP address may hide the at least one browser extension identifier.

In the system, the browser extension may transiently store or manipulate or both store and manipulate the content, and communicate the content between the API server and the at least one publisher webpage.

In the system, the browser extension may automate browser interactions to communicate the content.

In the system, the browser extension may initiate a communication of the content between the API server and the at least one publisher webpage in response to an input from a user.

In the system, the browser extension may comprise internal rules and triggers and the system may initiate the communication of the content between the API server and the at least one publisher webpage in response to the internal rules and triggers.

In the system, the input from the user may be at least one of a click, a plurality of clicks, a keystroke, a plurality of keystrokes, and the content, wherein the content comprises one or more of a text, a static image, a moving image, and a sound.

In the system, the browser may be configured to instruct the browser to communicate the IP address and a user agent associated with the user to the at least one publisher webpage through a forward or a reverse proxy.

In the system, the browser extension may be further configured to send a Hypertext Transfer Protocol (HTTP) request to the at least one publisher webpage and receive a response from the at least one publisher webpage.

In the system, the browser extension may be further configured to normalize or retransmit the content from the at least one publisher webpage.

In the system, the browser extension may be further configured for associating the content received from the at least one publisher webpage or the API server with an at least one data field on an at least one other publisher webpage.

In the system, the browser extension may be further configured for copying the content between the at least one publisher webpage or the API server and the at least one other publisher webpage.

In the system, the browser extension may be further configured to modify a document object model (DOM) representing the at least one publisher webpage.

In the system, the browser extension may be further configured to execute at least one of a Document Object Model Level 2 or Level 3 Event to the publisher webpage, thereby modifying the at least one identifier associated with the user device.

A method of distributing content on the internet to an at least one publisher webpage on a publisher server from an author device is also provided. The author device comprises a browser, a browser extension and an origin webpage. The method comprises the browser extension:

copying a content provided by an author, the origin webpage or an API server;

transiently storing the content;

appending or manipulating the content to an at least one Hypertext Markup Language (HTML) form or performing an at least one DOM 2 or Dom 3 event, thereby driving the content to the publisher server; and instructing the browser to provide an at least one author identifier to the at least one publisher webpage and to obscure an at least one automated behavior identifier from the at least one publisher webpage.

The method may further comprise using an at least one author credential to access the at least one publisher webpage.

In the method the content may be defined as an at least one text or binary file.

The method may further comprise fetching the content from the at least one publisher webpage and sending the content to the API server for copying.

The method may further comprise modifying a document object model (DOM) representing the at least one publisher webpage to allow a user to notify the API server of actions that the author or a viewer request the browser extension or API server to perform.

The method may further comprise updating the content on the API server in response to a successful distribution of content.

In another embodiment, a browser extension for use in distributing content on the Internet from a user device and an API server to an at least one publisher webpage on a publisher server is provided. The user device and the API server each have an at least one identifier associated with them, and the browser extension is configured to:

instruct a browser on the user device to communicate the at least one identifier associated with the user device to the at least one publisher webpage and not communicate the at least one identifier associated with the API server; and transiently store content and communicate a content between the user device, the API server and the at least one publisher webpage.

The browser extension may be further configured to communicate an at least one behavior associated with the user device to the at least one publisher webpage and hide an at least one behaviour associated with the API server or the browser extension.

The browser extension may be further configured to manipulate and communicate the content between the user device, the API server and the at least one publisher webpage.

The browser extension may be further configured to initiate a communication of the content in response to a user input or based on a browser extension logic, thereby modifying the at least one identifier.

The browser extension may be further configured to query the publisher server and send a result of the query to the API server.

The browser extension may be further configured to execute at least one of a Document Object Model Level 2 or Level 3 Event to the publisher webpage, thereby modifying the at least one identifier associated with the user device.

The browser extension may be further configured to modify a DOM representation of the publisher webpage on the user device or a viewer device to include an at least one new or modified element for a user interaction that communicates actions and the content to and from at least one of the browser extension and the API server.

In another embodiment, a system for use in searching an at least one third party webpage for a content and sending the content to an API server is provided, the system comprising:

the API server;

a distribution origin webpage;

a browser; and a browser extension on a user device, wherein the browser extension is configured to instruct the browser to conduct a search of the at least one third party webpage and communicate the content to the API server wherein the content is optionally normalized before being sent to the API server.

In the system, the browser extension may be further configured to recursively fetch the content from the at least one third party webpage and forward the content to the API server.

In the system the browser extension may be further configured to execute at least one of a Document Object Model Level 2 or Level 3 Event to the third party webpage, thereby modifying an at least one identifier associated with the user device.

In yet another embodiment, a system for use in modifying an at least one document object model (DOM) element of an at least one webpage is provided, the system comprising:
an API server;
a webpage;
a browser; and
a browser extension, wherein the browser extension is configured to append, edit or remove the DOM representation of the at least one webpage.

In yet another embodiment, a distribution system for use in at least one of distributing content to a publisher webpage, searching content on the publisher webpage and appending an at least one DOM element to the publisher webpage is provided, the distribution system comprising a distribution origin webpage having an internet domain associated with a Hypertext Transfer Protocol (HTTP) Referer, a browser and a browser extension, wherein the browser extension detects a user's action within the browser and independently opens a new blank tab or a window and pastes a Universal Resource Locator in an address bar of the publisher webpage thereby avoiding disclosing to the publisher webpage that the HTTP Referer was among the distribution origin webpage internet domain.

In yet another embodiment, a system for collecting a content from an at least one origin webpage and distributing the content to an at least one publisher webpage is provided, the system comprising: an application programming interface (API) server, the API server associated with an at least one API server identifier;
a user device;
a browser; and
a browser extension, the browser extension associated with an at least one browser extension identifier, wherein the user device, the browser, the browser extension and an Internet Protocol (IP) address collectively represent the at least one identifier associated with the user device to the at least one Publisher webpage and do not communicate the at least one API server identifier.

BRIEF DESCRIPTION OF THE DRAWINGS

FIG. 7 is a block diagram of steps A through E and A1 and A2.

DESCRIPTIONS OF THE PREFERRED EMBODIMENTS

Definitions

Figure 1:
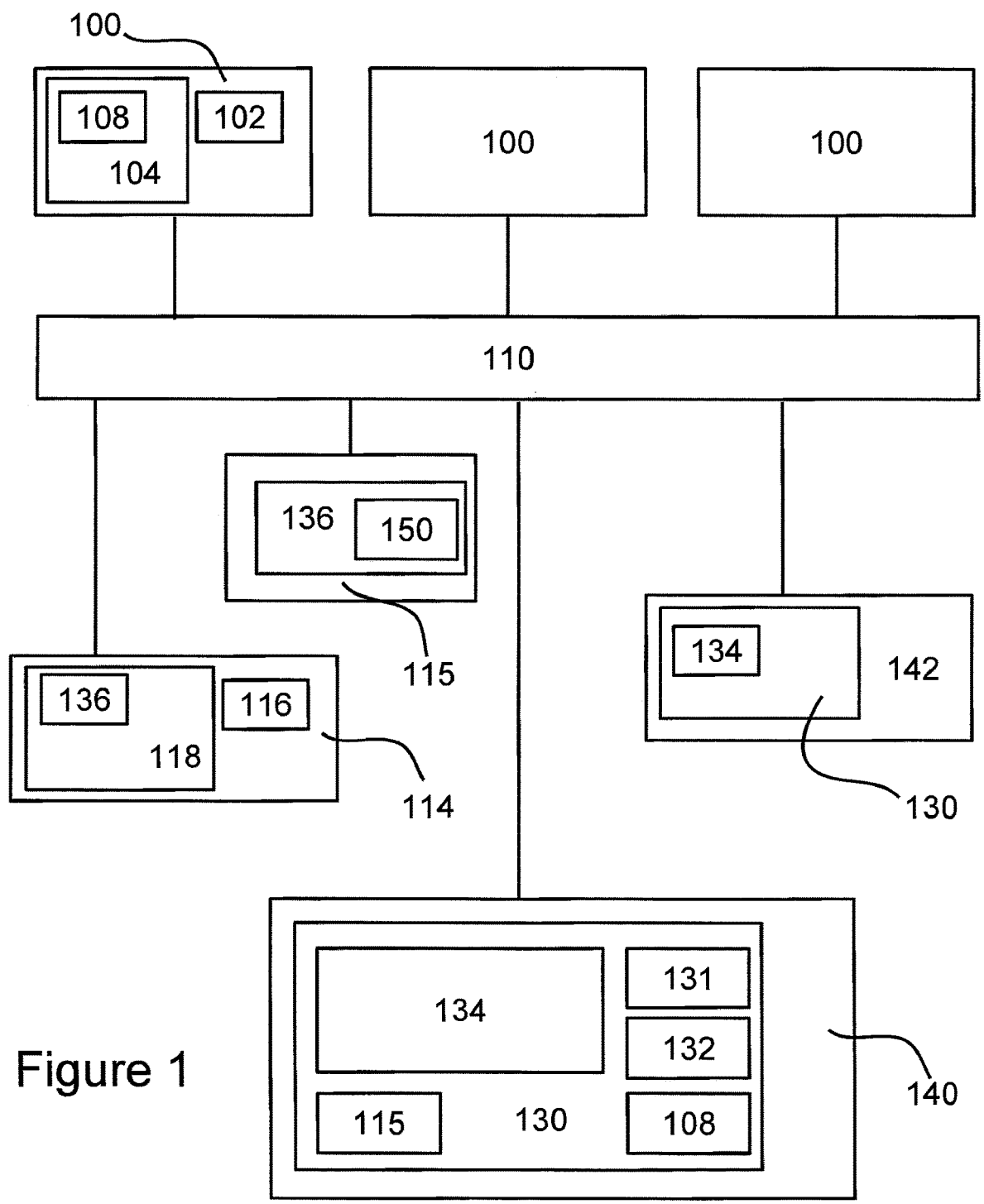
FIG. 1 is a block diagram of the system in which the present technology operates and the present technology.

The following are definitions of selected terms employed herein. The definitions may include non-limiting examples that fall within the scope of a term and that may be used for implementation.

"Browser" (or "Web Browser") is a software application retrieving, presenting, and traversing information resources on the Internet. A browser allows user-interaction to facilitate and augment communication.

"HTML" (Hypertext Markup Language) is a standardized system for tagging text files to achieve font, color, graphic, and hyperlink effects on the web.

"Content" includes text, HTML, graphics, data, binary objects, and images.

"DOM" (Document Object Model) is a platform and language neutral interface that allows entities (e.g., programs, threads, scripts) to dynamically access and manipulate the content, structure, and/or style of a document (e.g., web page).

"Logic" includes but is not limited to hardware, firmware, software, software in execution, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Ajax" (Asynchronous JavaScript and XML) is a group of interrelated web development techniques used on the client-side to create asynchronous web applications. With Ajax, web applications can send data to, and retrieve data from, a server asynchronously (in the background) without interfering with the display and behavior of the existing page.

"URL" stands for Universal Resource Locator. It is the address of a web page. Each page has its own unique web address (URL).

"HTTP" (Hypertext Transfer Protocol) is an application protocol for distributed, collaborative, hypermedia information systems. HTTP is the foundation of data communication for the web.

"IP address" (Internet Protocol address) is a numerical label assigned to each device (e.g., computer, printer) participating in a computer network that uses the Internet Protocol for communication. An IP address serves two principal functions: host or network interface identification and location addressing.

"User Agent" is software (a software agent) that is acting on behalf of a user. It, with the IP address, identifies a specific hardware and software combination implemented on a device.

"Distribution" is the act or process of distributing the same, similar, or modified content from a source to one or more publishers.

"Author", includes but is not limited to one or more persons or organizations, computers or other devices, or combinations of these that are involved in advertising or listing or the like, real property, goods, or services online, for the objective of selling, gifting, renting or leasing one or more of the above to a prospective client or buyer.

"Viewer", includes but is not limited to one or more persons or organizations, computers or other devices, or combinations of these that are viewing advertising or listings or the like online, for the objective of purchasing, renting or leasing one or more properties from an author.

"Author device" and "viewer device" refer to a computer, a cellular telephone, or a network device.

"Online" refers to website listings, viewed on computing devices (e.g., computer, cellular telephone, network device).

"Browser extension" refers to any software implementations that extend the functionality of the browser. This term is used interchangeably with "Add-on".

"Identifier" is a combination of software, hardware, actions, and behaviors which can be represented electronically and are available to third-parties as a means of distinguishing one person, computer, and/or automated process from another or combination of the said distinguishing elements.

"HTTP referrer" is an HTTP header field that identifies, from the point of view of an Internet webpage or resource, the address of the webpage (commonly the Uniform Resource Locator (URL); the more-generic Uniform Resource Identifier (URI); or the internationalization and localization (i18n)-updated Internationalized Resource Identifier (IRI) of the resource which links or linked to it. By checking the referrer, the new webpage can see where the request originated.

"Document Object Model Level 3 Events" are occurrences affecting the browser including at least one of: abort, blur, click, compositionstart, compositionupdate, compositionend, dblclick, error, focus, focusin, focusout, keydown, keypress, keyup, load, mousedown, mouseenter, mouseleave, mouseout, mouseover, mouseup, resize, scroll, select, unload, and wheel.

"Document Object Model Level 2 Events" are occurrences affecting the browser including at least one of: addEventListener, removeEventListener, dispatchEvent, stopPropagation, preventDefault, useCapture, attachEvent, detachEvent, fireEvent, and cancelBubble.

"Normalization" is the process of reducing data to its canonical form.

"Origin Webpage" is a website containing content that will be distributed to a published webpage.

"Publisher Webpage" is a webpage on a third-party website which allows externally-contributed content to be published.

"Application Programming Interface Server" (API Server) is an Internet-connected computer which cooperates with the browser extension. The API Server may send and/or receive instructions and data to or from the browser extension.

"Plurality" is two or more. In the context of the present technology, a plurality of webpages includes at least one origin webpage and at least one publisher webpage.

Note that network, World Wide Web and Internet are used interchangeably, each being means in which data can be exchanged between users.

DESCRIPTION

As shown in FIG. 1, a number of publisher servers 100 are shown for hosting a number of publisher webpages 108. Each publisher server 100 has, or has access to, a processor 102, and memory 104. The memory 104 stores publisher web pages 108. A network or Internet 110 is coupled to each publisher server 100. An API server 114 has a processor 116, and memory 118. A browser 130 has browser memory 131 and browser logic 132. The browser logic 132 interacts with a browser extension 134. The browser extension 134 is downloaded onto an author device 140 and/or a viewer device 142. The API server 114 hosts at least one distribution origin webpage 136. The network or Internet 110 is coupled to the API server 114, an origin website 115, the author device 140 and the viewer device 142.

Figure 2:
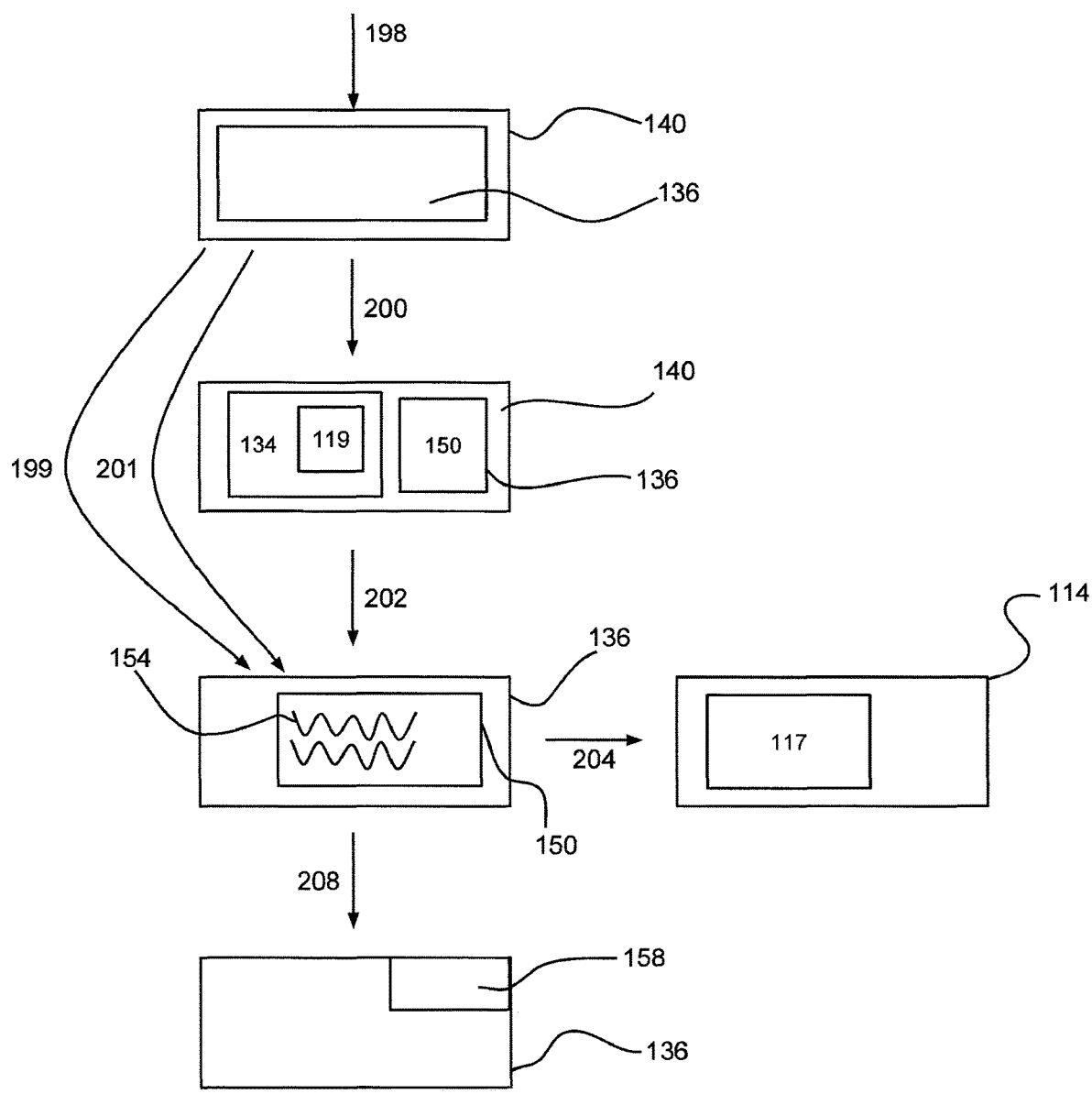
FIG. 2 is a block diagram of the first steps of the method when an author distributes content.

FIG. 2 shows the first steps taken by an author to distribute content to a number of websites, such that the IP address, behaviors, and user agent (identifiers) associated with the author is displayed to the publisher server 100 rather than API server identifiers 117 and other identifiers more clearly denoting automation. A browser extension identifier 119 is hidden. The author first opens 198 the distribution origin webpage 136 through the author device 140 and optionally logs in 200 with credentials or is automatically logged in 199, or is not logged in 201 and continues anyway. The following then occur between the author device 140 with the browser extension 134, the API server 114 and distribution origin webpage 136, and the publisher webpage 108 via the network or Internet 110:

Step 1

The author creates or opens an existing 202 origin content 150 with details about the source and themselves on the origin webpage 136;

Data and images 154 for the content 150 are sent 204 to the API server 114;

The author instructs 208 the browser extension to begin distribution; and

A prompt 158 optionally appears to request input in Step 2.

Step 2

Figure 3:
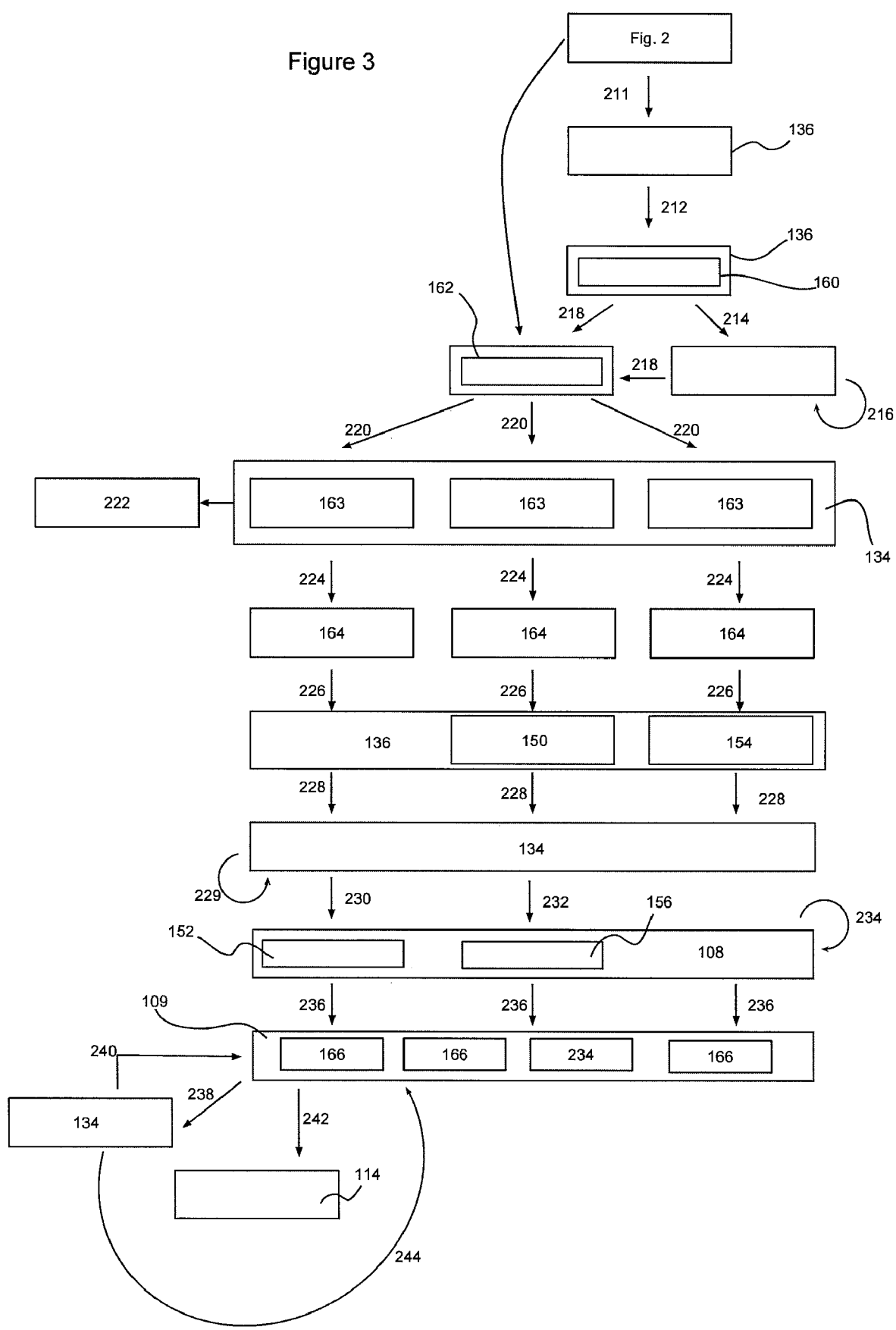
FIG. 3 summarizes FIG. 2 and is a block diagram of subsequent steps of the method when an author distributes content.

As shown in FIG. 3, the origin webpage 136 presents 211 the author to confirm or provide information and inputs;

On first use a "Download" link 160 appears 212 with text like "You must download and install the Browser Extension/AddOn before you can continue";

The author clicks 214 the "Download" link 160, which will prompt the author to grant permission to install the extension. Restarting 216 the browser 130 may be required;

If the browser extension 134 is already installed, the browser extension 134 will be detected and the "Download" link may be replaced 218 with a "Continue" button or no more barriers to continuing 162; and Optional and required input opportunities 163 are presented 220 to let the author choose which publisher webpage 108 to distribute to, and the content which is distributed.

At this point the author may store 222 their credentials that they want the browser extension 134 to use on publisher webpages 108. The author may furthermore choose whether they want the browser extension 134 to fully publish the content or if the author will have final manual input to confirm publication.

Step 3

The browser extension 134 knows when the "Continue" 162 button is clicked and when it is clicked, the browser extension 134 opens 224 a new tab or window 164 for each publisher webpage 108 that the author chooses to distribute to.

Step 4

The browser extension 134 retrieves 226 information from the distribution origin webpage 136 in "Step 1" and information stored by the author (the content to be distributed) 150 in "Step 3". The browser extension 134 ensures that the identifier comes from the browser 130 which interacts with the publisher webpage 108. This information may be stored and/or manipulated 228 locally on the author device by the browser extension 134 temporarily.

For each publisher webpage 108 that the browser extension logic distributes to, the browser extension 134 repeatedly associates 229 the publisher webpage 108 to ensure that the information will be loaded into the correct form fields 152 on the publisher webpages 108;

The browser extension 134 copies 230 information (the content to be distributed) 150 into the HTML form fields 152 on the publisher webpages 108. Data and images 154 are also attached 232 to file upload fields 156.

Each form is "submitted" 234 by the author or by the browser extension 134 according to the author's preferences as described above in "Step 2". Neither the IP address nor the user agent, nor any other identifier associated with the API server 114 are provided or otherwise visible to the publisher webpage 108;

The publisher webpage 108 redirects 236 the form to a page 109;

The browser extension 134 reads 238 the content coming from the page 109 that the publisher webpage 108 redirected to;

Note that the speed of loading can be varied from very quick to appearing to be typed out and manually loaded and all speeds in between; and The browser extension 134 optionally closes 244 the tab or window 164 containing the publisher webpages 108 and the page 109.

Figure 4:
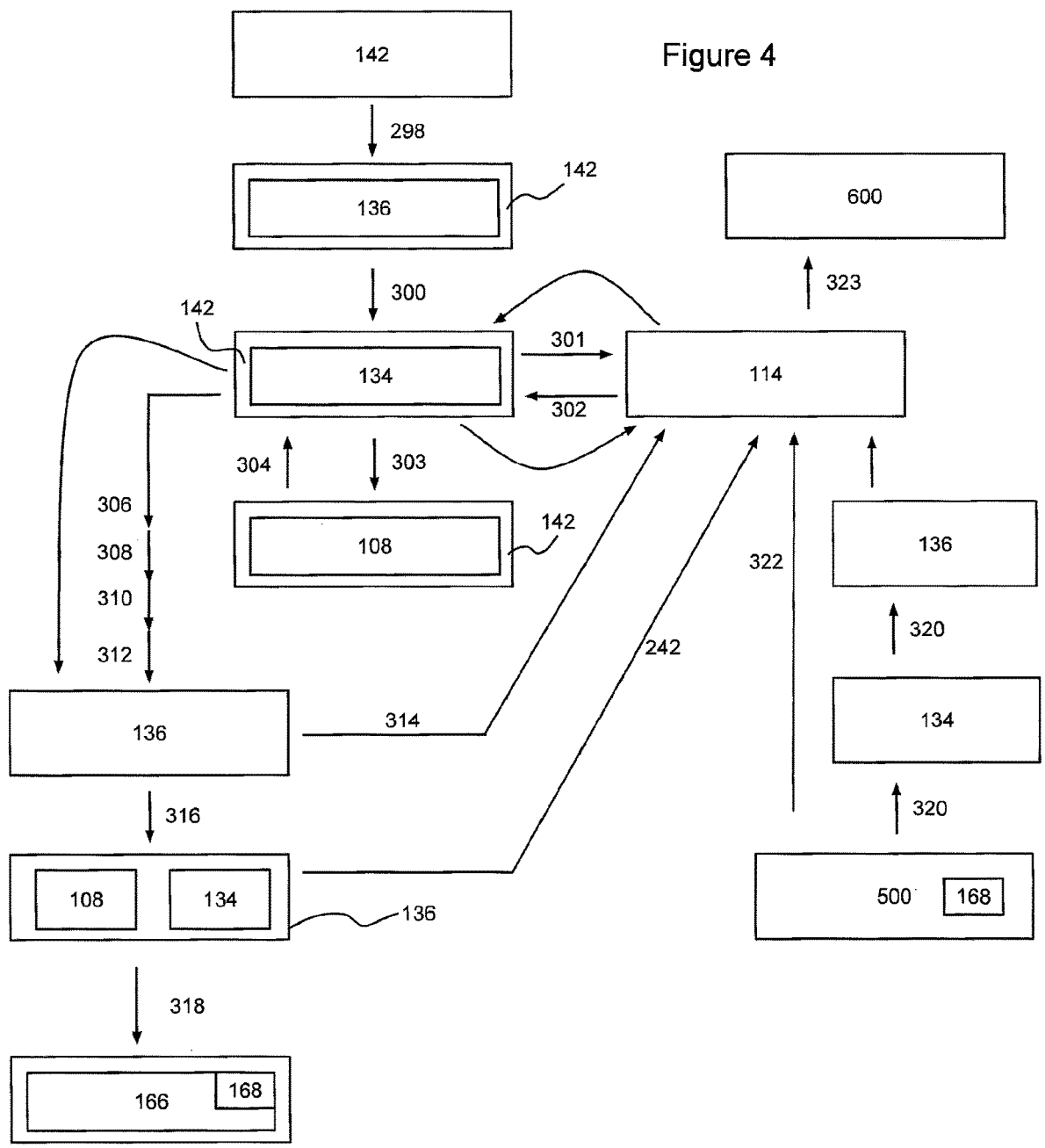
FIG. 4 is a block diagram of the steps of the method when a potential client (viewer) reviews distributed real estate information.

FIG. 4 shows how content from publisher webpages 108 is retrieved based on instructions from the API server 114 and the browser extension 134. First, a viewer 500 opens 298 any webpage 136 through the viewer device 142. The following then occur between the browser extension 134 on the viewer device 142, the API server 114 and the publisher webpage 108:

Step A

The browser extension 134 communicates 301 with the API server 114 asking if a new search needs to be performed for the geographic area in the listing of interest (the browser extension 134 is always listening for the distribution origin webpage 136 or any other page to be opened);

The API server 114 either indicates 302 that no search is required, or instructs 302 the browser extension 134 on the viewer device 142 to search specific publisher webpages 108 on the viewer device 142;

The browser extension 134 may either passively aggregate data already loaded in the browser or it may proactively create new HTTP requests to fetch information which the browser extension desires to aggregate from. The HTTP requests may be made asynchronously as a background process or synchronously in the foreground as presented to the user as a new browser tab or window.

Step B

The browser extension 134 sends 303 at least one HTTP request to the specific publisher webpages 108, using the IP address and user agent of the viewer device 142;

The publisher webpage 108 sends 304 an HTTP reply (containing retrieved content) to the browser extension 134;

The browser extension 134 parses 306 the text of the retrieved content;

The browser extension 134 maps 308 the retrieved content using associations and references to ensure that important data are not overlooked;

The browser extension 134 manipulates 310 the retrieved content;

Step C

The browser extension 134 appends 312 the retrieved content to a webpage served by the API server 114;

The new content is sent 314 to the API server 114;

Step D

The viewer 500 optionally opens 316 the listing of interest on a webpage served by the API server 114;

Concurrently, the browser extension 134 modifies 318 a DOM 166 by appending HTML elements 168 that includes elements such as "report expired listing" and "share this listing";

Step E

If the viewer 500 reports 320 an expired listing, the browser extension 134 notifies a webpage served by the API server 114 and it is automatically updated. If the viewer 500 clicks 322 "share this listing" via the HTML elements 168, the API servers 114 send 323 a message to the recipient which they open on an author or viewer device 600. This expands the viewership of the distribution origin webpage 136, which in turn, expands the search capability of the distribution origin webpage 136. To be clear, each computer that has the browser extension loaded on it, then becomes part of the search engine, potentially creating a viral expansion of the search engine.

Figure 5:
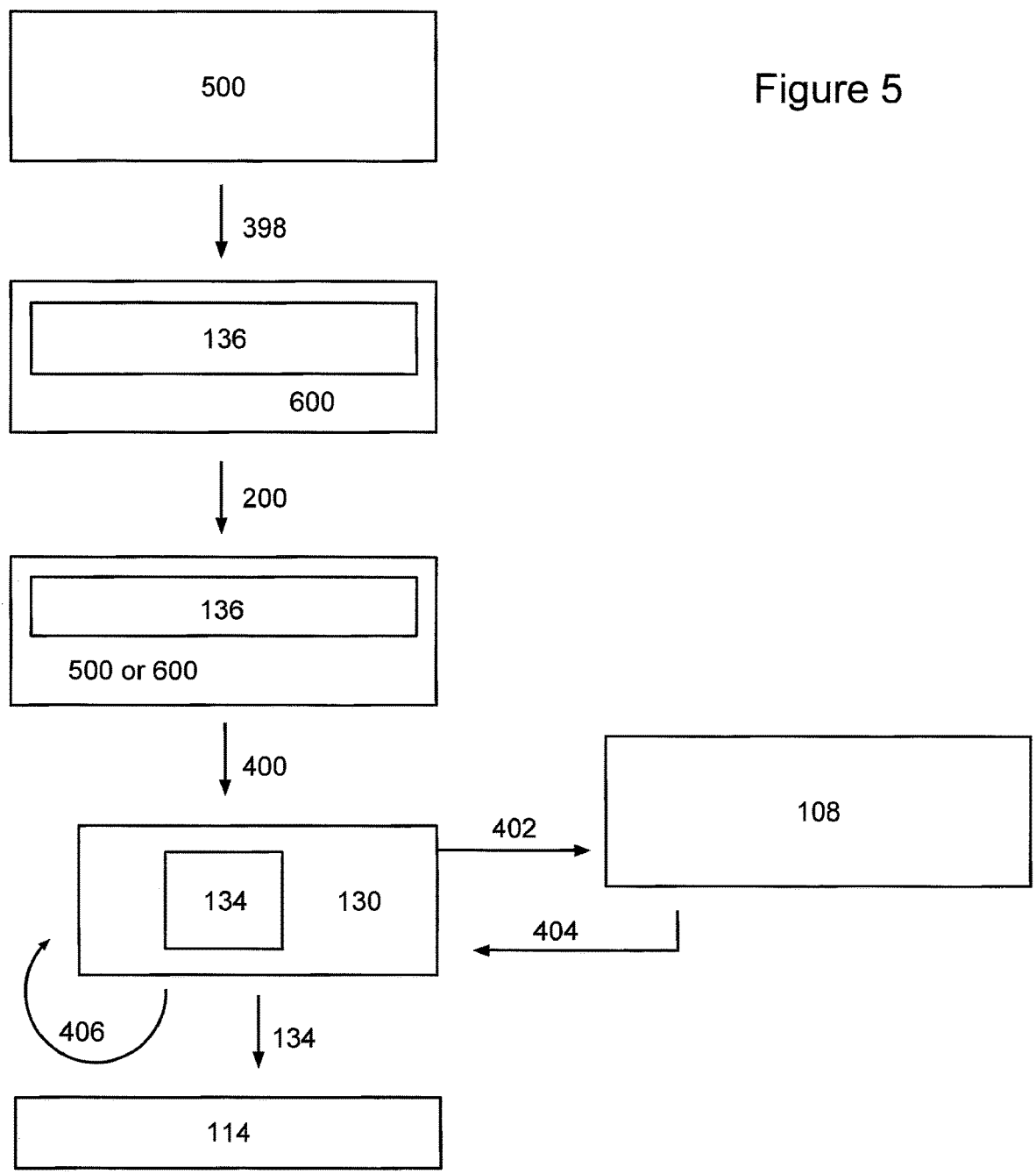
FIG. 5 is a block diagram of the steps of the method when a listing is reviewed for status.
Figure 6:
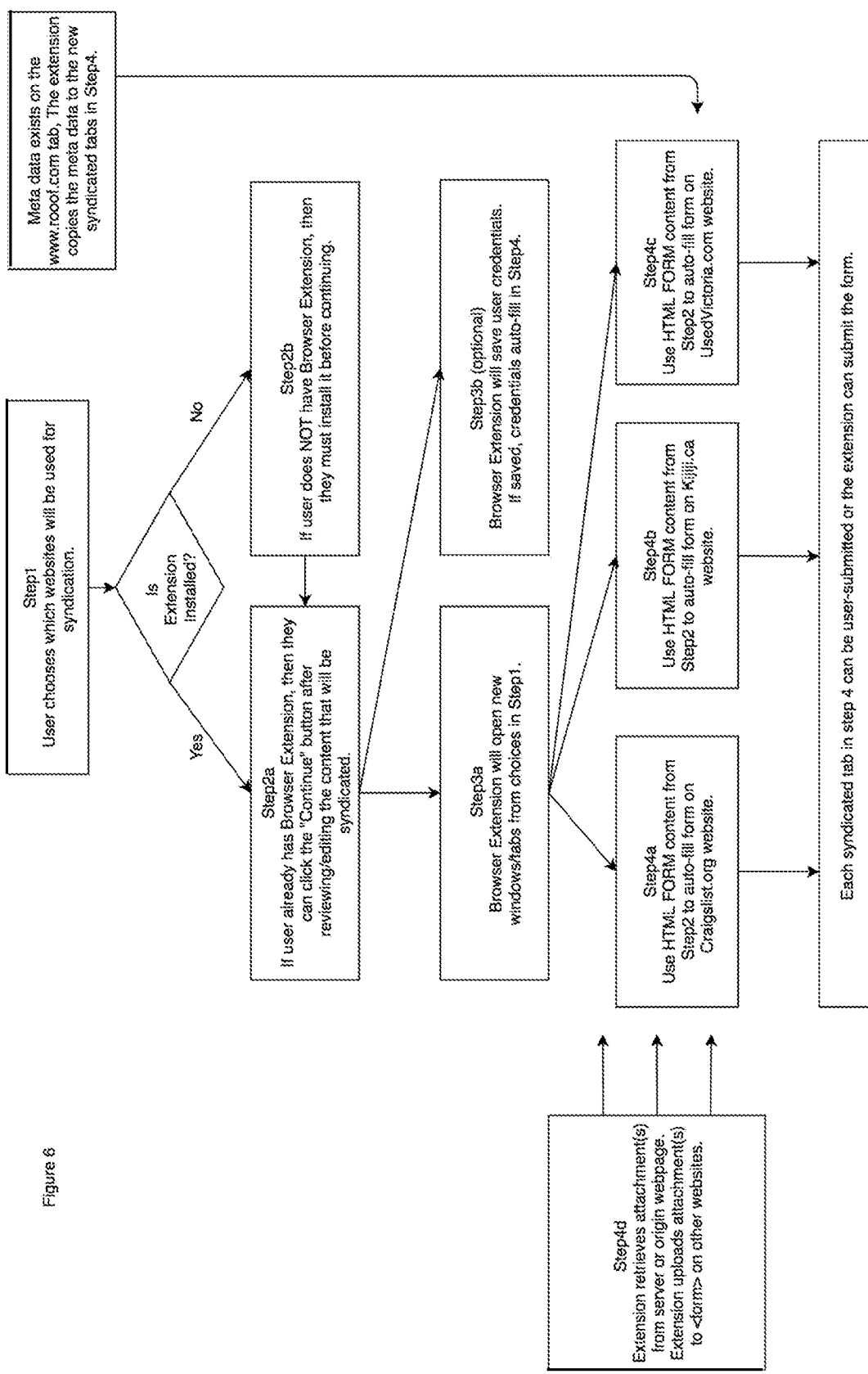
FIG. 6 is a block diagram of steps one through four of the method of the present technology.

FIG. 5 shows how an expired listing is found and the distribution origin webpage 136 is updated. The author or viewer 500 first opens 398 a webpage served by the API server 114 through the author or viewer device 600 and logs in 200 with credentials. The following then occur between the author or viewer device 600 including the browser extension 134, the API server 114 and distribution origin webpage 136 and the publisher webpage 108 via the network or Internet 110:

Step A1

The author or viewer 500 clicks 400 a link on a webpage served by the API server 114 to "Report Expired Listing";

The browser extension 134 sends 402 an HTTP request to the API server 114 using the identifier associated with the author or viewer;

Step A2

The publisher webpage 108 sends 404 an HTTP reply to the browser extension 134;

The browser extension 134 parses 406 the text of the retrieved content to look for elements which may indicate that the good, service, or real property is no longer available; and An "expired" or "alive" message is sent from the browser extension 134 to the API server 114.

Example 1

Property Manager—New Client has Multiple Units Available

A property manager got a new client who was an apartment building owner, and the building had several units for rent. The property manager went to Rooof™ to list the units online and provided all the information about the rental units, including pictures, location, and notes. He chose to then distribute the property listings to three different websites using the Rooof™ browser extension. A potential renter went onto one of the distributed websites and viewed the listing, then contacted the property manager. The Rooof™ IP address and user agent were not seen by the three different websites. Only the identifiers of the property owner or property manager were detected by the three different publisher websites.

Example 2

Building Manager—List an Apartment Unit

A building manager received notice from current tenants that they are vacating. She went to Rooof™ to list the unit online. She clicked the listing button on Rooof™ (example: List a Property) and filled out the form's drop down menus and check-boxes, uploaded photos, wrote a description and entered the location. She chose to distribute the listing to local online classified websites with the Rooof™ browser extension presenting identifiers (such as IP address and User Agent) of the building manager, not Rooof™. She then gets contacted by a potential renter via Rooof™ or one of the publisher websites. The Rooof™ IP address and user agent are not seen by the three different websites.

Example 3

Property Owner—Condo Unit for Rent

Condo owners listed their condo on Rooof™ and distributed the listing to three other websites for property rentals. They then wanted to go back into the listing details and change the availability date or utility costs. They edited the listing using the Rooof™ browser extension which then updated the listings on the other distributed websites as well. The Rooof™ IP address and user agent are not seen by the three different websites.

Example 4

Property Owner—Leasing a Suite in a House

A homeowner wanted to lease his/her house or part of the house for a year. He/she loaded Rooof™ and provided all the information about the house. The information was then distributed to three different websites using the IF address and user agent from the homeowner's device. A potential leaser went to one of the websites and viewed the listing, then contacted the homeowner about the house. The Rooof™ IF address and user agent are not seen by the three different websites. Once a leaser was found, the house was un-listed from all the above websites. This can be done through the Rooof™ website, using the browser extension.

Example 5

Tenant—Seeking Sublet or Vacation Rental Leaser

A tenant wanted to sublet their rental for 1-4 weeks while they are away on vacation. An ideal candidate would be someone looking for a vacation rental or short term stay. The tenant listed the property details, including the start and end dates of the sublet on Rooof™. They also wanted to distribute the listing to other popular online platforms for rentals, sublets and vacation rentals. For this, they used the Rooof™ browser extension to quickly get the property information on the Internet in numerous locations. When a candidate tenant sees the listing on one of the websites and contacts the current tenant, the Rooof™ IP address and user agent are not seen by the other websites.

Example 6

Tenant—Searching for a Place to Live

A tenant navigates to the Rooof™ website and wants to ensure that they get the most recent information available. To do so, they install the Rooof™ browser extension. The browser extension executes Internet communication to and from websites that it deems relevant to the tenant without repeated explicit action by the tenant in their browser. The browser extension presents the identifiers of the tenant and their device (software, hardware, and Internet service provider combination) to the third-party websites that the browser extension searches on behalf of the tenant. When the browser extension finds new information on third party websites, then that information is parsed and interpreted by the extension which then displays the results of the search on the Rooof™ website for immediate review by the tenant. The Rooof™ browser extension also sends the newly found information back to the Rooof™ servers for further dissemination to subsequent tenants who perform searches with or without the Rooof™ browser extension.

Example 7

Tenant—Found a Property of Interest on Rooof™

A tenant is using Rooof™ to search for a new home to live in. They find an interesting rental listing within Roof™'s search results, but the rental listing was originally published on a third party website. Because the tenant installed Roof™'s browser extension, then they can click on the link to that property listing and a new tab/window will open containing the original published content as hosted by the original publisher. To avoid disclosing to the original publisher that the HTTP Referer was among the Rooof.com domain, the browser extension detects the user's click and independently opens a new blank tab/window and then pastes the desired URL in the address bar. From the tenant's perspective, the new tab/window opened just like any typical HTML anchor would open the desired URL if the HTML target attribute instructed the browser to do so in a new tab/window rather than the current tab/window. From the perspective of the publisher website, they cannot see that Rooof™ referred the traffic from the Rooof.com domain to their domain. Instead, it appears to the third-party publisher website that the tenant typed the URL directly into the new tab/window without navigating from an existing web page which pointed to the publisher web page.

To summarize, in the present technology, images/files are copied by the browser extension 134 from the API server 114 to the temporary browser memory 131. The browser extension 134 then appends the image/file to the HTML form on the publisher webpage 108 as if the user had attached the image/file themselves. When the form is submitted, then the binary image/file is sent to the publisher server 100. The browser extension 134 stores an author's credentials to the publisher webpage 108 so that the values may be automatically filled on the HTML form. The form may then be submitted either by the author's mouse-click or by the browser extension 134. The browser extension 134 therefore gives instructions to the browser 130 to perform human-like activities, such as Document Object Model Level 3 Events, indistinguishable to the publisher webpage 108 or publisher server 100.

The foregoing is an embodiment of the present technology. Variations that do not alter the scope of the technology are contemplated. For example, the present technology may also modify the DOM as a means of inserting a banner advertisement for the distribution origin webpage as an additional feature.

What is claimed is:

1. A system for distributing content from a distribution origin webpage to a designated real estate or housing or classified advertising publisher webpage on a third party publisher server that requires multiple direct manual human interactions for form completion and file upload, the system comprising:
   a local computing device;
   a local browser executable on the local computing device to access the distribution origin webpage; and
   a browser extension installed and executable locally on the local computing device in response to a user's action within the local browser in relation to the distribution origin webpage and independently of any further user action, to autonomously and directly:
   retrieve the distribution content to be distributed from the distribution origin webpage, or an application programming interface (API) server, wherein the distribution content is transiently stored and manipulated locally on the local computing device by the browser extension to produce locally manipulated distribution content, and wherein the distribution content comprises one or more of plain text, a text file, a binary file, a graphics file or an image file;
   open a local instance of the designated real estate or housing or classified advertising publisher webpage in said local browser that requires the multiple direct manual human interactions for form completion and file upload; and
   append a Document Object Model (DOM) element to said local instance of the designated real estate or housing or classified advertising publisher webpage and autonomously and directly execute multiple DOM Level 2 or Level 3 Events that instruct the local browser to locally and directly perform human-like activities on said local instance of the designated real estate or housing or classified advertising publisher webpage in lieu of the multiple direct manual human interactions required for direct form completion and file upload so to permit submission of a completed form and uploaded file from said local instance of the designated real estate or housing or classified advertising publisher webpage and thus drive a distribution of the locally manipulated distribution content to the designated real estate or housing or classified advertising publisher webpage on the third party publisher server.

2. The distribution system of claim 1, wherein said browser extension is further executable to independently instruct the local browser to conduct a search of an at least one third party webpage and communicate third party webpage content to the API server.

3. The distribution system of claim 2, wherein said browser extension is further executable to fetch the third party webpage content from the at least one third party webpage and forward the content to the API server.

4. A method of automated distribution of real estate or housing or classified advertisements content to a designated real estate or housing or classified advertising publisher webpage on a third party publisher server that requires multiple direct manual human interactions for form completion and file upload, wherein the method is autonomously and directly executed by a browser extension executable on a local user computing device having a local browser executable thereon to access a distribution origin webpage, the method comprising the browser extension autonomously and directly:
   in response to a user action within the local browser in relation to the distribution origin webpage, independent of any further user action, performing multiple Document Object Model Level 2 or Document Object Model Level 3 Events, thereby driving the real estate or housing or classified advertisements content from the distribution origin webpage to the designated real estate or housing or classified advertising publisher webpage on the third party publisher server that otherwise requires the multiple direct manual human interactions for form completion and file upload, by:
   copying distribution content from the distribution origin webpage or an Application Programming Interface (API) as required to complete form fields and file upload on the designated real estate or housing or classified advertising publisher webpage;
   transiently storing and manipulating locally on the local user computing device the copied distribution content to produce locally manipulated distribution content as required to complete the form fields and file upload on the designated real estate or housing or classified advertising publisher webpage;
   modifying at least one form on a local instance of the designated real estate or housing or classified advertising publisher webpage that requires the multiple human interactions for form completion and file upload by autonomously and directly performing human-like activities on the local instance in lieu of the required multiple direct manual human interactions so to input the locally manipulated distribution content into the form fields and file upload and thereby permit submission of a completed form and uploaded file; and
   wherein the distribution content is in the form of one or more of plain text, a text file, a binary file, a graphics file or an image file.

5. The method of claim 4, wherein the local browser extension further executes the steps of communicating an at least one behavior associated with the local user computing device to the designated real estate or housing or classified advertising webpage and hide an at least one behavior associated with the API server or the browser extension.

6. The method of claim 5, wherein the browser extension further executes the steps of manipulating and communicating the distribution content between the local user computing device, the API server and the designated real estate or housing or classified advertising webpage.

7. The method of claim 6, wherein the browser extension further executes the steps of initiating a communication of the distribution content in response to a user input or based on a browser extension logic.

8. The method of claim 7, wherein the browser extension further executes the step of querying the publisher server and send a result of the querying to the API server.

9. The method of claim 4, wherein the browser extension is configured to autonomously instruct the local browser to conduct a search of an at least one third party webpage and communicate the content to the API server.

10. The method of claim 9, wherein the browser extension is further configured to autonomously and recursively fetch the content from the at least one third party webpage and forward the content to the API server.

11. The method of claim 9, wherein the method allows for automated distribution, search, notification, storage and manipulation that is transparent to the real estate or housing or classified advertising webpage.

12. The method of claim 4, further comprising appending a Document Object Model (DOM) Listener to the origin webpage to detect said user action within the local browser in relation to the origin webpage.

13. The method of claim 4, further comprising, in response to said user action, opening the instance of the designated real estate or housing or classified advertising publisher webpage in the local browser.

14. A non-transitory computer-readable medium having autonomously executable browser extension instructions locally stored thereon that are locally executable by a local user computing device having a local browser with access to a distribution origin webpage, to automatically distribute real estate or housing or classified advertisements content to a designated real estate or housing or classified advertising publisher webpage on a third party publisher server that requires multiple direct manual human interactions for form completion and file upload, by:
- in response to a user action within the local browser in relation to the origin webpage, independent of any further user action, performing multiple Document Object Model Level 2 or Document Object Model Level 3 Events, thereby driving the real estate or housing or classified advertisements content from the distribution origin webpage to the designated real estate or housing or classified advertising publisher webpage on the third party publisher server that otherwise requires the multiple direct manual human interactions for form completion and file upload, by:
- copying distribution content from the origin webpage or an Application Programming Interface (API) related thereto as required to complete form fields and a file upload on the designated real estate or housing or classified advertising publisher webpage;
- transiently storing and manipulating locally on the local user computing device the copied distribution content to produce locally manipulated distribution content as required to complete the form fields and file upload on the designated real estate or housing or classified advertising publisher webpage; and
- modifying at least one Hypertext Markup Language (HTML) form on a local instance of the designated real estate or housing or classified advertising publisher webpage that requires the multiple direct manual human interactions for form completion and file upload by autonomously and directly performing human-like activities on the local instance in lieu of the required multiple direct manual human interactions so to input the locally manipulated distribution content into the form fields and file upload and thereby permit submission of a completed form and uploaded file; and
- wherein the distribution content is in the form of one or more of plain text, a text file, a binary file, a graphics file or an image file.

15. The non-transitory computer-readable medium of claim 14, further operable to append a DOM Listener to the origin webpage to detect said user action within the local browser in relation to the origin webpage.

16. The non-transitory computer-readable medium of claim 14, further operable to, in response to said user action, open the instance of the designated real estate or housing or classified advertising publisher webpage in the local browser.

* * * * *